(12) United States Patent
Lokkinen

(10) Patent No.: US 10,828,661 B2
(45) Date of Patent: Nov. 10, 2020

(54) PROCESS AND APPARATUS FOR TREATING THE INNER SURFACE OF A PIPE

(71) Applicant: PICOTE SOLUTIONS OY LTD, Porvoo (FI)

(72) Inventor: Mika Lokkinen, Porvoo (FI)

(73) Assignee: PICOTE SOLUTIONS OY LTD., Porvoo (FI)

( * ) Notice: Subject to any disclaimer, the term of this patent is extended or adjusted under 35 U.S.C. 154(b) by 123 days.

(21) Appl. No.: 16/075,636

(22) PCT Filed: Feb. 2, 2017

(86) PCT No.: PCT/FI2017/050055
§ 371 (c)(1),
(2) Date: Aug. 4, 2018

(87) PCT Pub. No.: WO2017/134343
PCT Pub. Date: Aug. 10, 2017

(65) Prior Publication Data
US 2019/0054496 A1 Feb. 21, 2019

(30) Foreign Application Priority Data
Feb. 4, 2016 (FI) ...................................... 20160025

(51) Int. Cl.
*B05C 7/08* (2006.01)
*A46D 1/00* (2006.01)
(Continued)

(52) U.S. Cl.
CPC ................ *B05C 7/08* (2013.01); *A46B 9/026* (2013.01); *A46D 1/0207* (2013.01);
(Continued)

(58) Field of Classification Search
CPC . F16L 55/18; F16L 55/26; F16L 58/02; F16L 2101/16; A46D 99/00; A46D 1/00;
(Continued)

(56) References Cited

U.S. PATENT DOCUMENTS

| | | | | |
|---|---|---|---|---|
| 1,455,065 A | * | 5/1923 | Bellows | B05C 7/08 118/58 |
| 1,671,374 A | * | 5/1928 | Moore | B05C 7/08 118/58 |

(Continued)

FOREIGN PATENT DOCUMENTS

| | | |
|---|---|---|
| FI | 123198 B * | 12/2012 |
| GB | 614842 | 12/1948 |

(Continued)

OTHER PUBLICATIONS

Stango, R. J.; Khullar, P. Fundamentals of Bristle Blasting Process for Removing Corrosive Layer. Paper No. 09191, NACE International Corrosion 2009 Conference & Expo; 2009, 1-13. (Year: 2009).*

(Continued)

*Primary Examiner* — William P Fletcher, III
(74) *Attorney, Agent, or Firm* — Fasth Law Offices; Rolf Fasth

(57) ABSTRACT

The coating device has a rotatable spindle which has fastening mechanisms for fastening a rotation axle to the spindle. Protrusions are radially protruding from the spindle for spreading the coating substance on the inner surface of a pipe. The protrusions have limiters that limit the coating substance to be spread to the desired layer thickness. The method comprises the steps of bringing, to the pipe to be treated, the coating device fastened to a rotation axle with the pipe, a feeding hose of the coating substance and a camera. The coating substance is fed along the feeding hose to a vicinity of the coating device. The coating substance is spread to an inner surface of the pipe by rotating the coating device and by moving the coating device in a longitudinal direction of the pipe.

12 Claims, 4 Drawing Sheets

(51) Int. Cl.
  *B05D 7/22* (2006.01)
  *A46B 9/02* (2006.01)
  *B05C 11/02* (2006.01)
  *F16L 55/1645* (2006.01)

(52) U.S. Cl.
  CPC ......... *A46D 1/0238* (2013.01); *A46D 1/0253* (2013.01); *B05C 11/021* (2013.01); *B05D 7/222* (2013.01); *A46B 2200/20* (2013.01); *F16L 55/1645* (2013.01)

(58) Field of Classification Search
  CPC .......... A46D 1/02; A46D 1/0253; A46D 7/10; A46D 9/028; A46D 2200/00; A46D 2200/202; A46D 2200/3013; A46D 2200/40; A46D 2200/405; B05D 7/22; B05D 7/222; B05D 7/225; B05D 1/28; B05D 2254/04; B05D 7/08; B08B 9/02; B08B 1/002; B08B 9/027; B08B 9/04; B08B 9/045; B08B 9/0553; B08B 2209/00; B08B 2209/02; B08B 2209/027; B08B 2209/04
  See application file for complete search history.

(56) References Cited

U.S. PATENT DOCUMENTS

| | | | | |
|---|---|---|---|---|
| 1,863,950 A | * | 6/1932 | Stubbs | A46B 7/10 15/179 |
| 2,158,579 A | * | 5/1939 | Hodgkins | B05C 7/08 118/254 |
| 2,172,433 A | * | 9/1939 | Churchill | A46B 7/10 300/21 |
| 2,399,321 A | * | 4/1946 | Butler | B28B 19/0023 118/668 |
| 2,484,018 A | * | 10/1949 | Crom | B28B 19/0023 264/270 |
| 2,704,873 A | * | 3/1955 | Kirwan | B28B 19/0023 118/694 |
| 3,108,348 A | | 10/1963 | Schultz | |
| 4,371,569 A | * | 2/1983 | Muta | B05C 7/08 427/230 |
| 6,467,121 B1 | * | 10/2002 | Franzino | B08B 9/0436 15/104.09 |
| 10,005,168 B2 | * | 6/2018 | Lokkinen | B08B 9/0436 |
| 2015/0184785 A1 | * | 7/2015 | Richards, Jr. | F16L 55/1645 138/97 |
| 2015/0217323 A1 | * | 8/2015 | Broze | B05C 7/00 427/239 |
| 2019/0329303 A1 | * | 10/2019 | Lokkinen | B08B 9/0436 |

FOREIGN PATENT DOCUMENTS

| | | | | |
|---|---|---|---|---|
| GB | 2540395 A | * | 1/2017 | ............. E03C 1/302 |
| WO | WO-2010008025 A1 | * | 1/2010 | ............. C22C 38/02 |
| WO | WO-2013079799 A1 | * | 6/2013 | ............. B24D 13/06 |

OTHER PUBLICATIONS

Wang, Z.; Gu, H. A Bristle-Based Pipeline Robot for III-Constraint Pipes. IEEE/ASME Transactions on Mechatronics 2008, 13 (3), 383-392. (Year: 2008).*

* cited by examiner

PROCESS AND APPARATUS FOR TREATING THE INNER SURFACE OF A PIPE

PRIOR APPLICATIONS

This is a US national phase patent application that claims priority from PCT/FI2017/050055 filed 2 Feb. 2017, that claims priority from Finnish Patent Application No. 20160025, filed 4 Feb. 2016.

BACKGROUND OF THE INVENTION

The invention relates to coating a pipe from the inside in connection with renovating pipe systems and, in particular, to a device for spreading a coating.

Pipe systems have for long been renovated by pumping coating substance to the pipe system being renovated and by levelling the coating substance to form a layer no more than 1 mm thick and with relative evenness on the inner surface of the pipe by means of rotating a brush. After the coating has dried, the treating has been repeated from two to four times to achieve an adequate coating thickness and to cover the possible impurities left in the pipe system entirely within the coating. For rotating a brush, a power transfer device set forth in the Finnish patent application FI123198 has been available, by means of which the power from a motor is conveyed within a non-rotating protective casing to the brush by a rotating, flexible shaft. A hose feeding the coating substance as well as a camera for monitoring the work results during the coating process may be fixed to the protective casing.

A problem with the arrangement described in the above is the slow progress of the work, because a plurality of coating layers are needed and a previous layer needs to dry before the subsequent is spread. The more fluent the coating is, the more layers will be needed. Coating substances with a high viscosity have the tendency to adhere to and gather on the bristles of the brush. The thickness of the coating layer is further restricted by how even the brushing can make the coating layer, and it has not been possible to produce reliably coating layers thicker than one millimetre.

BRIEF DESCRIPTION OF THE INVENTION

It is therefore an object of the invention is to provide an apparatus and a method based on it so as to solve the above problems. The object of the invention is achieved by a method, device, and system which are characterized by what is disclosed in the independent claims. Preferred embodiments of the invention are disclosed in the dependent claims.

The invention is based on the idea to replace the brush used in coating with small strips connected to the spindle and operating in a spaddle-like manner. The use of such a solution is enabled by the fixing of the spaddle-like strips to the spindle so that it supports the spaddles as the spindle is being rotated, but allows the strips to bend, if need be, more when the spindle is pushed or pulled.

The benefit of the method and system according to the invention is the thicker coating layer it allows with one round of treating and a coating layer more even as regards its thickness. The device is additionally easy to move in the pipe system, whereby the device may be pushed, for example, through a thin spot in the pipe system, and it only leaves minor marks in a coating already spread but not yet dry.

BRIEF DESCRIPTION OF THE FIGURES

The invention will now be described in more detail in connection with preferred embodiments and with reference to the accompanying drawings, in which.

DETAILED DESCRIPTION OF THE INVENTION

Figure 1:
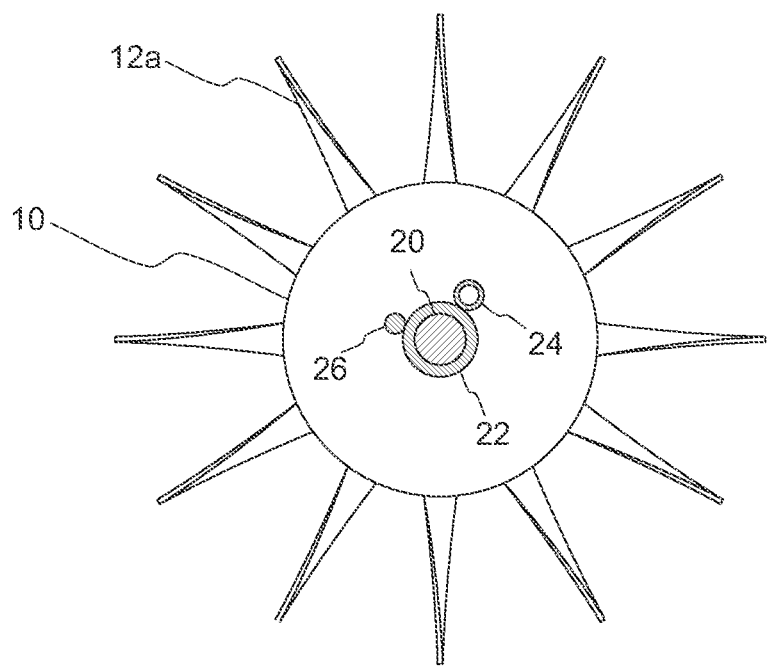
FIG. 1 shows a coating device according to an embodiment of the invention in the direction of the rotation axle of the spindle.
Figure 2:
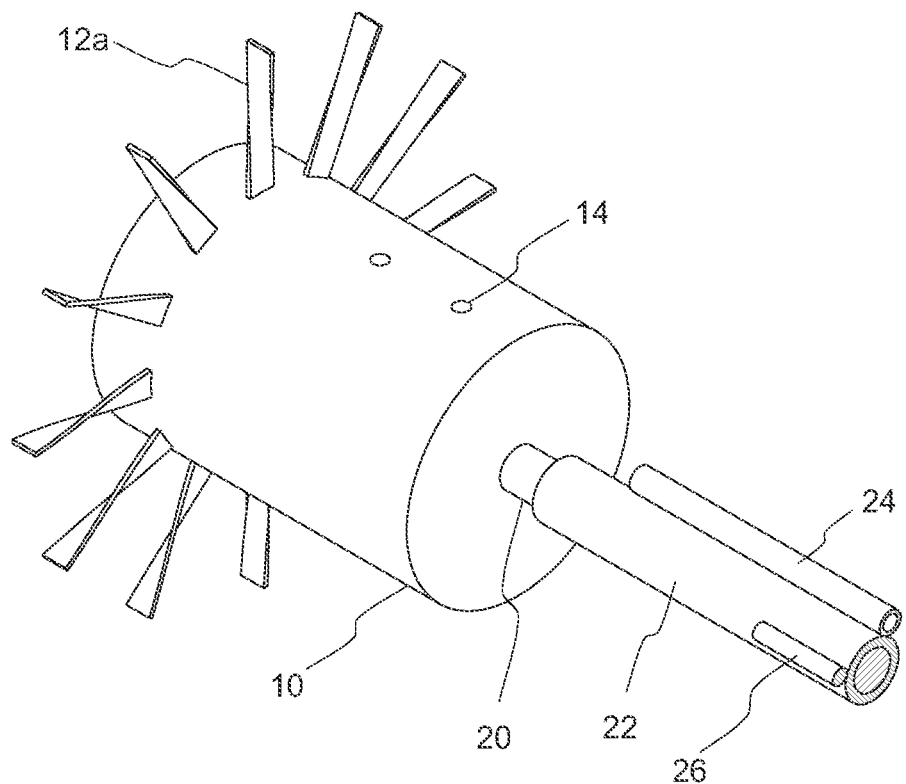
FIG. 2 shows a coating device according to an embodiment of the invention in an oblique direction in relation to the rotation axle.

The first aspect of the invention is a coating device. Referring to FIGS. 1 and 2, a coating device according to an embodiment of the invention comprises a cylindrical spindle 10 and protrusions 12a extending radially from it for spreading coating substance on the inner surface of a pipe. The spindle 10 is arranged to be rotated around its rotation axle, and the spindle may be rotated by means of a rotation axle 20 by using a rotation device. A rotation device suitable for the purpose is set forth in the patent publication FI123198 (Picote Oy Ltd). The spindle has fastening means 14 for fastening the rotation axle to the spindle, and the fastening means may consist of, for example, an opening in the spindle to which the rotation axle 20 is inserted and locked in place with screws through threaded openings 14 made in the spindle. There may be one or more openings and screws. Other fastening means, too, may be used to fasten a spindle to a rotation axle.

The protrusions 12a protrude radially from the spindle 10 and advantageously in directions perpendicular to the rotation axle of the spindle, in other words, directly outward of the spindle. The protrusions are flexible and plate-like strips that twist around the axis of their longest side. The twist between the end fixed to the spindle and the outermost end, as seen from the spindle, is in an embodiment advantageously approximately 90°, for example, 90°±20° or 90°±5°. The protrusion 12a and their twisting are arranged in the spindle 10 so that the cross-sectional area of the protrusion 12a, in the direction of the rotation axle of the spindle 10, is at its smallest at the outermost end of the protrusion 12a, as viewed from the spindle 10. In an embodiment, the cross-sectional area of the protrusion 12a in the direction of the rotation axle of the spindle 10 is at its biggest at the end of the protrusion 12a, which is fixed to the spindle 10. In an embodiment, the cross-sectional area of the protrusion 12a in the direction of the rotation axle of the spindle 10 is continuously smaller as the distance to the rotation axle of the spindle 10 increases. With the arrangements described, the shape and positioning in the spindle of the protrusion support the protrusions when the spindle is being rotated, but yet allows them to bend more, if needed, when the spindle is pushed or pulled. With the described protrusions that work in a spaddle-like manner, a thicker layer thickness is achieved, typically no less than 1.5 mm and advantageously more than 2.0 mm with one treatment, and a more even coating layer. After a second treatment, an adequate coating layer is achieved and the possible minor impurities are left entirely within the coating layers. In addition, the device is easy to move in the pipe system, and it only leaves grooves the width of the protrusions in a coating already spread but still unhardened as the device is moved in a pipe recently coated. In the embodiment of FIG. 2, the protrusions 12a are fixed to the spindle 10 in one row, so the same circumference around the spindle. Typically, only a portion of 20-40 cm of a pipe is coated at a time, after which a return back is made and the coating outcome is checked. When a conventional brush is used, this stage is problematic because when the brush is pushed it makes a major change in the coating layer already spread, because the brush touches the coating layer almost throughout.

The coating device according to the invention may be produced out of many different materials. The protrusions 12a need to be flexible, but the spindle 10 is advantageously of a more rigid and/or harder material than the protrusions. In an embodiment, the spindle 10, protrusions 12a, and their limiters 13 have been accomplished as a uniform piece of at least two materials by way of die-casting. In an embodiment, the protrusions are advantageously of nylon, which is flexible, and the spindle is advantageously made of harder plastic grades or of a light-weight metal, such as aluminium or an alloy. The spindle must be able to handle the fastening of the rotation axle and reliably keep the protrusions fixed to the spindle. In an embodiment, the protrusions may be, for example, rectangular plate-like strips, whereby their thickness without a twist is approximately 1 mm, advantageously 0.1-3 mm. the width approximately 10 mm, advantageously 5-20 mm and the length advantageously larger than the width and thickness.

Figure 3:
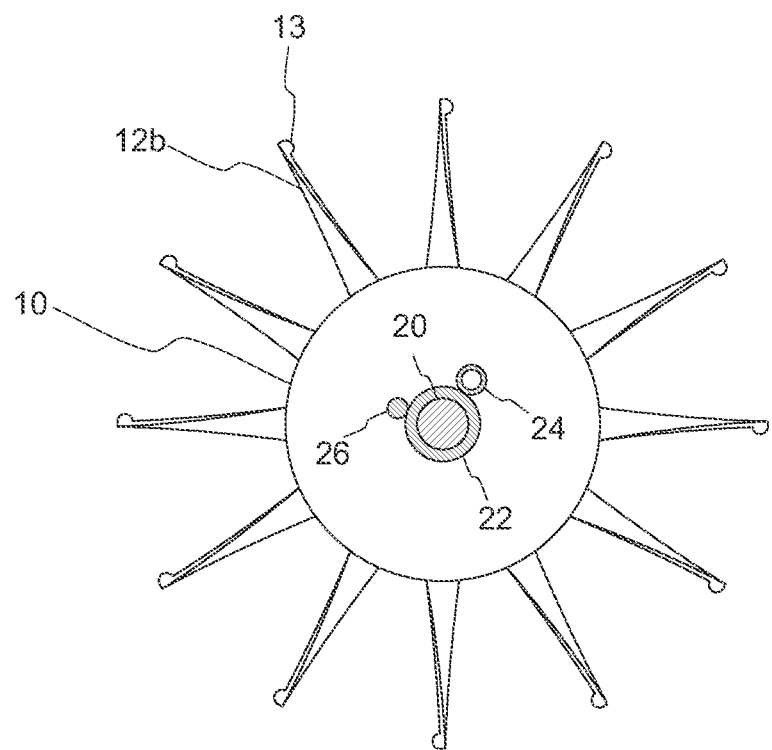
FIG. 3 shows a coating device according to an embodiment of the invention in the direction of the rotation axle of the spindle.
Figure 4:
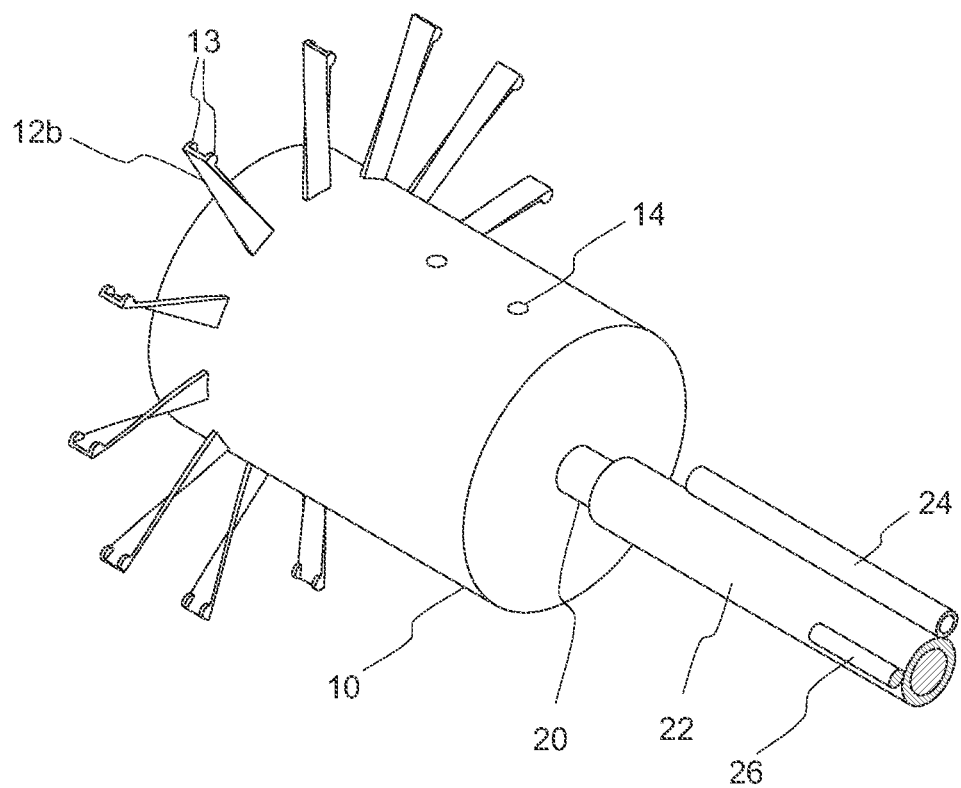
FIGS. 4-6 show coating devices according to the embodiments of the invention in an oblique direction in relation to the rotation axle.

FIGS. 3 and 4 show a coating device according to an embodiment of the invention, which comprises a cylindrical spindle 10 protrusions 12b extending radially from it for spreading coating substance on the inner surface of a pipe. The spindle 10 is arranged to be rotated around its rotation axle, and the spindle may be rotated by means of a rotation axle 20 by using a rotation device. The spindle has fastening means 14 for fastening the rotation axle to the spindle, and the fastening means may consist of, for example, an opening in the spindle to which the rotation axle 20 is inserted and locked in place with screws through threaded openings 14 made in the spindle. There may be one or more openings and screws. Other fastening means, too, may be used to fasten a spindle to a rotation axle.

The protrusions 12b protrude radially from the spindle 10 and advantageously in directions perpendicular to the rotation axle of the spindle, in other words, directly outward of the spindle. The protrusions are flexible and plate-like strips that twist around the axis of their longest side. The twist between the end fixed to the spindle and the outermost end, as seen from the spindle, is in an embodiment advantageously 90°, or approximately 90°. The protrusion 12b and their twisting are arranged in the spindle 10 so that the cross-sectional area of the protrusion 12b, in the direction of the rotation axle of the spindle 10, is at its smallest at the outermost end of the protrusion 12b, as viewed from the spindle 10. In an embodiment, the cross-sectional area of the protrusion 12b in the direction of the rotation axle of the spindle 10 is at its biggest at the end of the protrusion 12b, which is fixed to the spindle 10. In an embodiment, the cross-sectional area of the protrusion 12b in the direction of the rotation axle of the spindle 10 is continuously smaller as the distance to the rotation axle of the spindle 10 increases. With the arrangements described, the shape and positioning in the spindle of the protrusion support the protrusions when the spindle is being rotated, but yet allows them to bend more, if needed, when the spindle is pushed or pulled.

The protrusions 12b have limiters 13 arranged in connection with the outermost end in relation to the spindle. When used in a pipe, the protrusions 12b bend and the limiters limit the part of the protrusion between the limiters 13 to a distance determined by the limiters from the inner surface of the pipe. In such a case, when coating substance is being spread, the limiters guarantee a specific layer thickness of the coating substance, as determined by the limiters 13, on the inner surface of the pipe when enough coating substance is dosed to allow the layer thickness. The coating substance levels on its own to the grooves formed by the limiters 13, thus forming a coating substance layer of the desired thickness, in practise uniform, on the inner surface of the pipe. By changing the size and shape of the limiters, the layer thickness formed by the coating device may be influenced. Advantageously, limiters 13 the shape of semi-circles are used, located in connection with the outermost end of the protrusion 12b, and which limiters protrude from the protrusion in the circumferential direction, in other words, orthogonally to the radial direction of the coating device. Limiters protruding in the radial direction from the end of a protrusion may also be used. The limiters 13 may be plate-like parts of the shape of a semi-circle, quarter-circle, parallelogram, or rectangle, with the thickness of approximately 1 mm, advantageously 0.1-3 mm. The limiters protrude from the surface of the strip-like part by 0.5-5 mm, for example, depending on the desired layer thickness. The limiters 13 are advantageously of the same part as the protrusion, whereby the limiters have been formed on the protrusion already at its manufacturing stage. There may be one limiter 13 per a protrusion in the middle of the protrusion in the lateral direction. There are advantageously two limiters 13 per protrusion, advantageously at the edges in the lateral direction as shown in FIG. 4. There may also be more than two limiters 13, and they be located at any place of the protrusion 12b in the lateral direction. In an embodiment, there are two limiters 13 at the end of the protrusion 12b at the edges of the protrusion in the lateral direction, and furthermore one or more limiters are placed on the protrusion 12b further away from the end of the protrusion than said limiters at the edge in the lateral direction.

With the protrusions that work in a spaddle-like manner and are provided with the described limiters 13, a thicker layer thickness is achieved, typically no less 1.5 mm and advantageously over 2.0 mm with one treatment and a more even coating layer. After a second treatment, an adequate coating layer is achieved and the possible minor impurities are left entirely within the coating layers. In addition, the device is easy to move in the pipe system, and it only leaves grooves the width of the protrusions in a coating already spread but still unhardened as the device is moved in a pipe recently coated. In the embodiment of FIG. 4, the protrusions 12b are fixed to the spindle 10 in one row, so the same circumference around the spindle. Typically, only a portion of 20-40 cm of a pipe is coated at a time, after which a return back is made and the coating outcome is checked.

The coating device according to the invention may be produced out of many different materials. The protrusions 12b need to be flexible, but the spindle 10 is advantageously of a more rigid and/or harder material than the protrusions. In an embodiment, the spindle 10 and protrusions 12b have been accomplished as a uniform piece by die-casting at least two different materials. In an embodiment, the protrusions are advantageously of nylon, which is flexible, and the spindle is advantageously made of harder plastic grades or of a light-weight metal, such as aluminium or an alloy. The spindle must be able to handle the fastening of the rotation axle and reliably keep the protrusions fixed to the spindle. In an embodiment, the protrusions may be, for example, rectangular plate-like strips, whereby their thickness without a twist is approximately 1 mm, advantageously 0.1-3 mm. the width approximately 10 mm, advantageously 5-20 mm and the length advantageously larger than the width and thickness.

Figure 5:
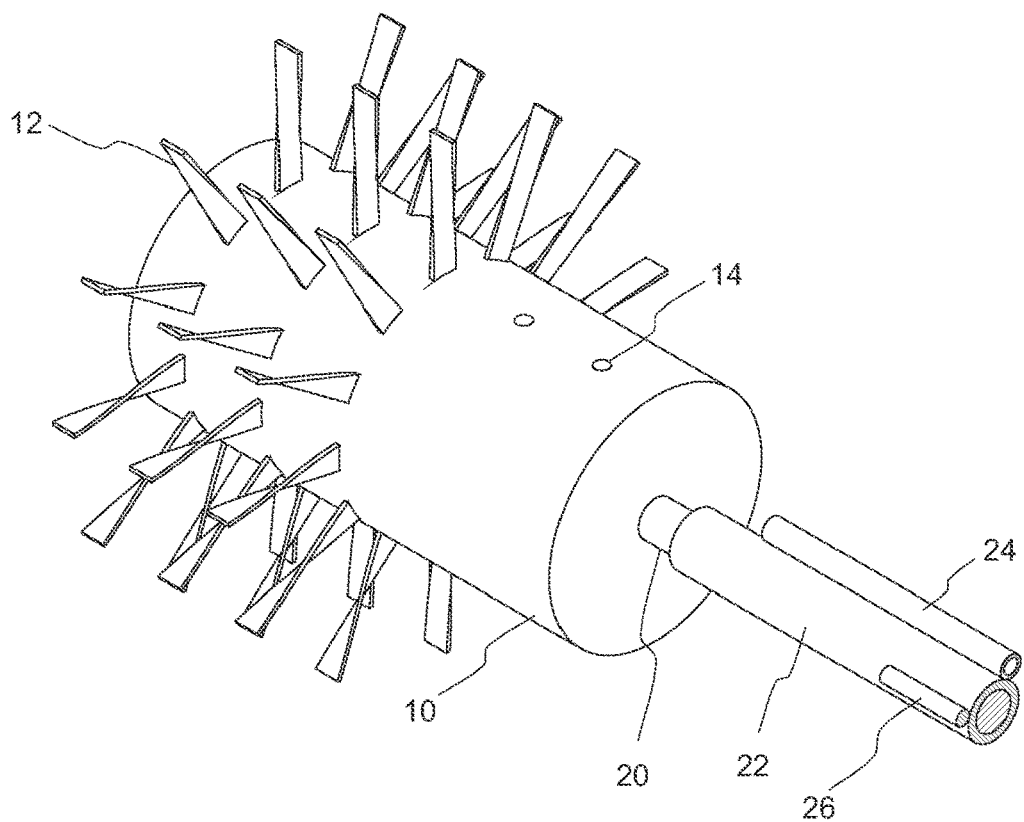
Figure 6:
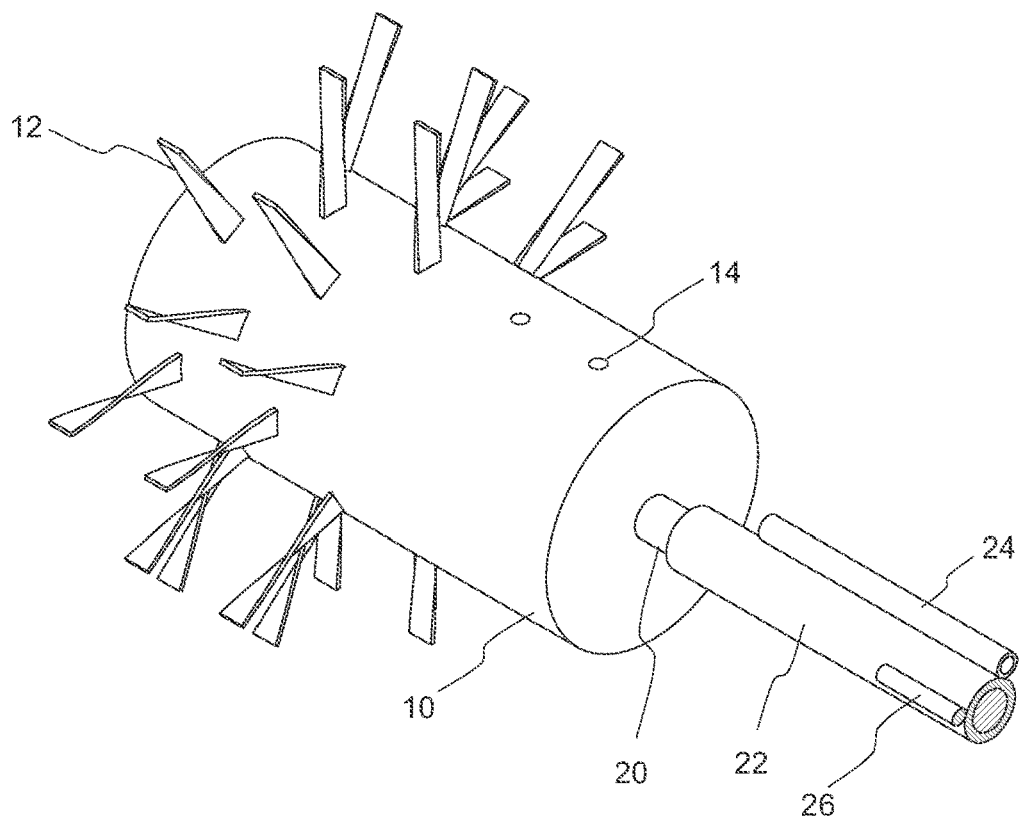
Figure 7:
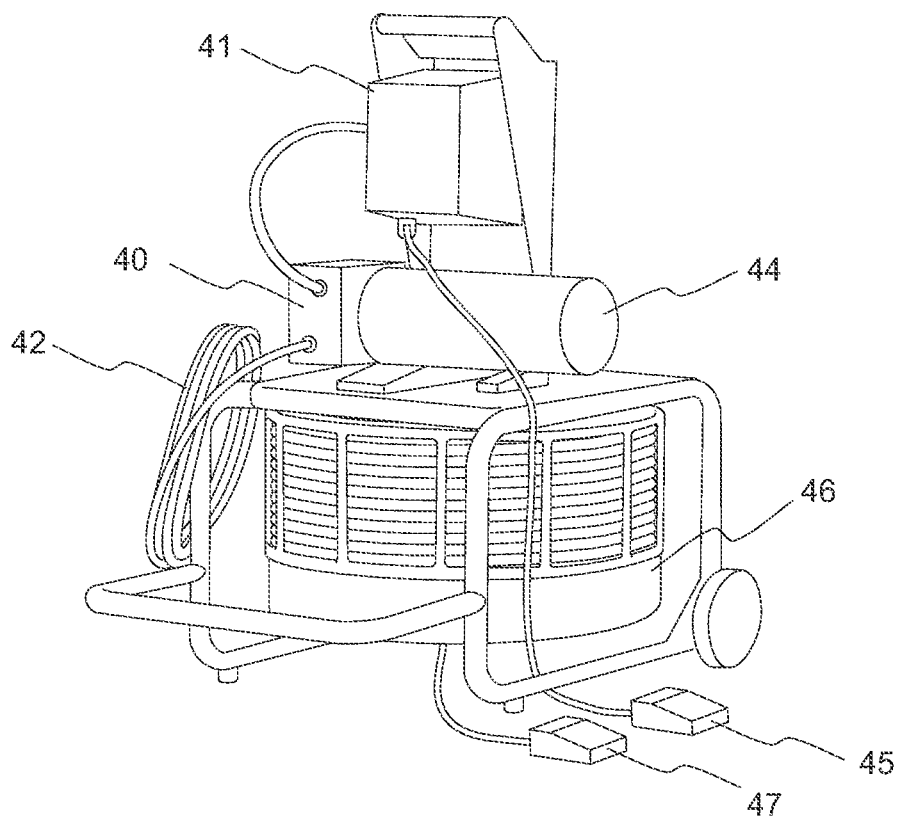
FIG. 7 shows a coating system according to an embodiment of the invention.

FIGS. 5 and 6 show different embodiments of the inventive coating device and connecting them to a coating system. FIG. 7 shows a coating system according to an embodiment, except for the coating device.

In the embodiment of FIG. 5, the protrusions 12 are fastened to the spindle 10 in several rows around the spindle so that, on the rotation axle, the protrusions of adjacent rows are positioned in the same places on the circumference of the spindle. In the embodiment of FIG. 6, the protrusions 12 are fastened to the spindle 10 in several rows around the spindle and more scattered than in FIG. 5 so that, on the rotation axle, the protrusions of adjacent rows are positioned in different places on the circumference of the spindle. In FIGS. 5 and 6, as a protrusion 12 either the protrusions 12a shown in FIGS. 1 and 2, having no limiters, may be used, or the protrusions 12b of FIGS. 3 and 4, which have the limiters 13. So, the reference number 12 may refer to the protrusion 12a or 12b.

In an embodiment of the inventive coating system according to a second aspect of the invention, the system comprises a coating substance container 40 and a hose 42 to be connected to it, a peristaltic pump 44 for pumping the coating substance through the hose 42 to the target being coated, and advantageously a guiding device 41 and a pedal 45 connected to it to control the peristaltic pump 44, for treating the inner surface of a pipe with the coating substance, and a rotation device 46 for rotating the coating device, whereby the coating device is a coating device according to an embodiment of the first aspect of the invention, a coating device specified in independent claim 1 or a dependent claim referring to it, or a brush consisting of a body and round bristles less than 1 mm thick. The coating device advantageously comprises a cylindrical spindle 10 arranged to be rotated around its rotation axle, and said spindle 10 having fastening means 14 for fastening the rotation axle to the spindle 10 which further comprises protrusions 12 radially extending from the spindle 10 for spreading coating substance on the inner surface of a pipe. The protrusions 12 on the coating device are flexible and plate-like strips that twist around the axis of their longest side so that the cross-sectional area of the protrusion 12, in the direction of the rotation axle of the spindle 10, is at its smallest at the outermost end of the protrusion 12, as viewed from the spindle 10. In an embodiment, the coating device of the coating system is a brush consisting of a body and round bristles less than 1 mm thick. The bristles are advantageously of nylon or of another polymer.

In an embodiment, the rotation device 46 of the coating system comprises a flexible rotation axle 20, such as a wire or a spring wire, as well as a protective pipe 22 and a reel arranged to be rotatable and the rotation axle of which is arranged substantially vertically in relation to the platform on which the device has been installed when the device is in its operational position. The rotation device further comprises a motor in connection with the beginning of the rotation axle 20 for rotating the rotation axle 20 in the protective pipe, and said reel additionally has an outer circumference and an inner circumference between which there is a space where the rotation axle 20 with its protective pipe 22 may be reeled. The rotation device additionally comprises a pedal 47 for controlling the motor of the rotation device. In an embodiment, the coating system additionally comprises a camera 26, and in which the rotation axle 20, protective pipe 22, feeding hose 42 of coating substance, and camera 26 are arranged to be moved together in the pipe being treated. Advantageously the feeding pipe 42 and the camera 26 are secured to the protective pipe 22 with tape or cable ties whereby they may easily be handled together, but it need be they may also be easily separated.

In an embodiment of the coating method according to a third aspect of the invention, the coating method for treating the inner surface of a pipe comprises the following steps:

a) Bringing, to the pipe to be treated, a coating device fastened to a rotation axle 20 with a protective pipe 22. The rotation axle is advantageously a flexible rotation axle which at one end is connected to the motor of the rotation device 46 rotating it, and to the coating device at its other end.

b) Bringing, to the pipe being treated, the feeding hose 42 of the coating substance, in connection with the protective pipe 22. The feeding hose may be secured to the protective pipe with tape, for example, whereby they stick together and move together when one of them or both are pushed or pulled in the pipe being treated. One end of the feeding hose is in the coating substance container 40, from where the hose passes through the peristaltic pump 44 with the protective pipe to the pipe being treated, and the hose ends at an open end or a nozzle at, for example, 2 cm or 1-10 cm from the spot where the protective casing 22 ends or the rotation axle 20 meets the coating device.

c) Bringing, to the pipe being treated, the camera 26, in connection with the protective pipe. The camera is advantageously a small-sized camera transmitting video picture on a signal cable and obtains the electric power is uses through the same or different cable. The cable(s) and camera may also be mounted in connection with the protective casing 22 and feeding hose 42, whereby they all move together and remain in the same position with regard to each other. The camera 26 is advantageously at a distance of 20 cm or 10-40 cm, for example, from the spot where the feeding hose 42 or protective casing 22 ends, or the rotation axle 20 meets the coating device.

d) Feeding coating substance along the feeding hose 42 to the vicinity of the coating device. For the feeding, a peristaltic pump 44 is used, in which rolls which press the hose from the outside of the pipe and which simultaneously move push the coating substance forward in the pipe and at the same time suck more coating substance to the hose from the coating substance container. The use of a peristaltic pump guarantees an almost maintenance-free operation, because the coating substance is not in contact with the pump, and the used hoses may be disposed of and replaced with new ones between jobs.

e) Spreading the coating substance to the inner surface of the pipe by rotating the coating device in the pipe and by moving the rotation device in the longitudinal direction of the pipe. The coating device is rotated with the motor of the rotation device, the power of which is conveyed to the rotation device with the rotation axle, inside the protective casing for the most part.

The method is characterised in that the spreading of the coating substance at step e) takes place by using a coating device according to an embodiment of the first aspect of the invention, a coating device specified in independent claim 1 or a dependent claim referring to it. In an embodiment, a coating device is used, which is a brush consisting of a body and round bristles less than 1 mm thick. The bristles are advantageously of nylon or of another polymer. In an embodiment, two-component epoxy is used as the coating substance, consisting of epoxy resin and hardener. The components of the epoxy are mixed prior to their spreading with the coating device. In an embodiment of the method, several layers of the coating substance are spread, and subsequent layers of the coating substance use a colour that differs from the colour of the previous layer. By changing the colour of the coating substance between layers, possible deviations that have taken place in the spreading of the coating substance are visually easy to notice.

In an embodiment of the method, the coating device is taken in the pipe being treated, in which the coating device has been brought, by pushing on the protective casing of the rotation axle, for example, to the furthest spot of the portion being treated of the pipe being treated, before starting the feeding of the coating substance. The coating substance is fed at an amount needed for approximately 30 cm by controlling the peristaltic pump and by pulling and pushing on the protective casing the coating device is guided in the pipe being treated simultaneously rotating it. By examining the picture that the camera sends, the succeeding of the spreading may be examined. If need be, the coating device may be pushed further in the pipe so that the latest area that was treated may be examined more easily. The coating device according to the first aspect of the invention may allow a better visibility between its protrusions than between the bristles of the brush, whereby it is not always necessary to return over the treated area. In any case the protrusions of the coating device leave fewer marks on the treated area, because the areas of the protrusions, which contact the coating material are very narrow in the direction of the movement of the coating device as it is pushed and pulled. Once the spreading outcome has been checked, it may still be fixed, if need be, or treat a new pipe section approximately 30 cm in length. This is continued until the entire pipe being treated has been coated.

In connection with the disclosed coating device, higher viscosity coating substances may be used, because the coating substance will not stick to the protrusions in the same way as between the bristles of a brush-type coating device. With the minor marks or damages created at the examination phase described above, thicker coating layers may be achieved with one round of treatment than with prior art devices and methods. A higher viscosity coating substance may be established by absorbing wood fibres in the known coating substances, for example. This way, one round of treatment may advantageously reach a layer thickness of more than 1.5 mm, advantageously more than 2.0 mm, and most advantageously more than 2.5 mm.

A person skilled in the art will find it obvious that, as technology advances, the basic idea of the invention may be implemented in many different ways. The invention and its embodiments are thus not restricted to the above-described examples but may vary within the scope of the claims.

While the present invention has been described in accordance with preferred compositions and embodiments, it is to be understood that certain substitutions and alterations may be made thereto without departing from the spirit and scope of the following claims.

I claim:

1. A coating device for treating the inner surface of a pipe with a coating substance, the coating device comprising:
   a cylindrical spindle arranged to be rotated around a rotation axle of the cylindrical spindle, and which spindle has a fastening means for fastening the rotation axle to the spindle having protrusions radially extending from the spindle for spreading a coating substance on the inner surface of the pipe, the protrusions being flexible strips that twist around the axis of a side of the strips so that a cross-sectional area of the protrusions, in a direction of the rotation axle of the spindle, is disposed at an end of the protrusions, as viewed from the spindle, and
   said protrusions comprise limiters which limit a part of the protrusions between the limiters to a distance determined by the limiters from the inner surface of the pipe for spreading the coating substance as a layer of constant thickness on the inner surface of the pipe as the coating device is rotated.

2. The coating device as claimed in claim 1, wherein said protrusions twist round the axis of the side so that the cross-sectional area of the protrusions in the direction of the rotation axle of the spindle is at a position at the end of the protrusion, which is fixed to the spindle, with the limiters excluded.

3. The coating device as claimed in claim 1, wherein said limiters are parts with a thickness of 0.1-3 mm, which limiters protrude from the surface of the protrusion at the outermost end of the protrusion in relation to the spindle.

4. The coating device as claimed in claim 1, wherein said protrusions twist spirally around the axis of the side so that the twist between the end of the protrusion fixed to the spindle and the end, as seen from the spindle, is 90°±5°.

5. The coating device as claimed in claim 1 wherein said protrusions are of a flexible material.

6. The coating device as claimed in claim 1 wherein the spindle and the protrusions are a unitary piece.

7. A coating system for treating the inner surface of a pipe, which coating system comprises:
   a coating substance container and a hose to be connected to the container, a peristaltic pump for pumping the coating substance through the hose to a target being coated, a coating device for treating an inner surface of a pipe with the coating substance, and a rotation device for rotating the coating device,
   the coating device having a cylindrical spindle arranged to be rotated around a rotation axle of the cylindrical spindle, and which spindle has a fastening means for fastening the rotation axle to the spindle having protrusions radially extending from the spindle for spreading a coating substance on the inner surface of the pipe, which protrusions are flexible strips that twist around the axis of a side of the strips so that a cross-sectional area of the protrusions, in a direction of the rotation axle of the spindle, is disposed at an end of the protrusions, as viewed from the spindle, and
   said protrusions comprise limiters which limit a part of the protrusions between the limiters to a distance determined by the limiters from the inner surface of the pipe for spreading the coating substance as a layer of constant thickness on the inner surface of the pipe as the coating device is rotated.

8. The coating system as claimed in claim 7, wherein said rotation device comprises:
   a flexible rotation axle and a protective pipe surrounding the flexible rotation axle at least partly,
   a reel arranged to be rotatable and the rotation axle of which is arranged substantially vertically in relation to the platform on which the device has been installed when the device is in an operational position, a guide for feeding the rotation axle to the reel and/or unreeling the rotation axle, a motor in connection with a beginning of the rotation axle for rotating the rotation axle, and in which said reel has an outer circumference and an inner circumference between which there is a space where the rotation axle with the protective pipe is reeled.

9. The coating system as claimed in claim 7 wherein the coating system additionally comprises a camera, and in which the rotation axle, the protective pipe, the feeding hose of the coating substance, and the camera are arranged to be moved together in the pipe being treated.

10. A method for treating the inner surface of a pipe, the method comprising the steps of:

providing a coating device having a cylindrical spindle arranged to be rotated around a rotation axle of the cylindrical spindle, and which spindle has a fastening means for fastening the rotation axle to the spindle having protrusions radially extending from the spindle for spreading a coating substance on the inner surface of the pipe, which protrusions are flexible strips that twist around the axis of a side of the strips so that a cross-sectional area of the protrusions, in a direction of the rotation axle of the spindle, is disposed at an end of the protrusions, as viewed from the spindle, said protrusions comprise limiters which limit a part of the protrusions between the limiters to a distance determined by the limiters from the inner surface of the pipe for spreading the coating substance as a layer of constant thickness on the inner surface of the pipe as the coating device is rotated, bringing, to the pipe to be treated, a coating device fastened to a rotation axle with a protective pipe, bringing, to the pipe being treated, a feeding hose of the coating substance, bringing, to the pipe being treated, a camera, in connection with the protective pipe, feeding coating substance along the feeding hose to a vicinity of the coating device, and spreading the coating substance to an inner surface of the pipe by rotating the coating device in the pipe and by moving the coating device in a longitudinal direction of the pipe.

11. The method as claimed in claim 10, wherein the coating substance is a two-component epoxy, the component of which are mixed prior to feeding the coating substance along the hose to the vicinity of the coating device.

12. The method as claimed in claim 10, wherein at least two layers of the coating substance are spread one on top of one another.

* * * * *